US00RE33788E

United States Patent [19]

Clay

[11] E Patent Number: Re. 33,788

[45] Reissued Date of Patent: Jan. 7, 1992

[54] WATER-IN-OIL BLASTING COMPOSITION

[75] Inventor: Robert B. Clay, Bountiful, Utah

[73] Assignee: Hanex Products, Inc., Bountiful, Utah

[21] Appl. No.: 887,466

[22] Filed: Jul. 21, 1986

Related U.S. Patent Documents

Reissue of:

[64] Patent No.: 4,111,727
Issued: Sep. 5, 1978
Appl. No.: 834,772
Filed: Sep. 19, 1977

[51] Int. Cl.[5] ..... C06B 45/00

[52] U.S. Cl. ..... 149/1; 149/46; 149/60; 149/61; 149/76; 149/83

[58] Field of Search ..... 149/2, 46, 60, 61, 76, 149/83

[56] References Cited

U.S. PATENT DOCUMENTS

| | | | |
|---|---|---|---|
| Re. 28,060 | 7/1974 | Cattermole et al. | 149/2 |
| 3,004,342 | 10/1961 | Rowlinson et al. | 52/14 |
| 3,052,578 | 9/1962 | Davis et al. | 149/60 |
| 3,124,495 | 3/1964 | Hradel | 149/43 |
| 3,161,551 | 12/1964 | Egly et al. | 149/46 |
| 3,164,503 | 1/1965 | Gehrig | 149/18 |
| 3,180,768 | 4/1965 | Scott, Jr. | 149/2 |
| 3,242,010 | 3/1966 | Gehrig | 149/18 |
| 3,275,485 | 9/1966 | Egly | 149/47 |
| 3,282,754 | 11/1966 | Gehrig | 149/74 |
| 3,287,189 | 11/1966 | Wilson et al. | 149/8 |
| 3,288,661 | 11/1966 | Swisstack | 149/60 |
| 3,296,044 | 1/1967 | Gehrig | 149/47 |
| 3,356,547 | 12/1967 | Berthmana et al. | 149/51 |
| 3,376,176 | 4/1968 | Gehrig | 149/46 |
| 3,377,909 | 4/1968 | Grant | 86/20 |
| 3,442,727 | 4/1969 | Thornton | 149/46 |
| 3,447,978 | 6/1969 | Bluhm | 149/2 |
| 3,453,158 | 7/1969 | Clay | 149/41 |
| 3,470,041 | 9/1969 | Gehrig | 149/2 |
| 3,617,406 | 11/1971 | Young | 149/41 |
| 3,684,597 | 8/1972 | Robins et al. | 149/46 |
| 3,706,607 | 12/1972 | Chrisp | 149/2 |
| 3,708,356 | 1/1973 | Mason et al. | 149/2 |
| 3,711,344 | 1/1973 | Tomic | 149/22 |
| 3,715,247 | 2/1973 | Wade | 149/21 |
| 3,764,421 | 10/1973 | Clark | 149/46 |
| 3,765,964 | 10/1973 | Wade | 149/2 |
| 3,765,967 | 10/1973 | Funk et al. | 149/21 |
| 3,768,410 | 10/1973 | Maes et al. | 149/36 |
| 3,770,522 | 11/1973 | Tomic | 149/2 |
| 3,787,254 | 1/1974 | Cook et al. | 149/60 |
| 3,790,415 | 2/1974 | Tomic | 149/2 |
| 3,810,425 | 5/1974 | Post | 149/47 |
| 3,926,698 | 12/1975 | Cook et al. | 149/60 |
| 3,943,820 | 3/1976 | Persson | 149/44 |
| 3,956,040 | 5/1976 | Tezuka | 149/41 |
| 4,008,108 | 2/1977 | Chrisp | 149/2 |
| 4,141,767 | 2/1979 | Sudweeks et al. | 149/2 |

FOREIGN PATENT DOCUMENTS

| | | |
|---|---|---|
| 281537 | 9/1964 | Australia . |
| 789482 | 7/1968 | Canada . |
| 1143267 | 2/1968 | United Kingdom . |
| 1256765 | 12/1971 | United Kingdom . |
| 1306546 | 2/1973 | United Kingdom . |

OTHER PUBLICATIONS

Clark, George B., "Mining Research" Pergamon Press, 1962, vol. 1, pp. 29–30 and 47.

Cook, Melvin A., "The Science of Industrial Explosives", Ireco Chemicals, 1974, pp. 200–266.

Cook, Melvin A., "The Science of High Explosives", Reinhold Publishing Corporation, 1958, pp. 313–314.

Hester, Albert S., "Stengel Process Ammonium Nitrate", Industrial and Engineering Chemistry, vol. 46, No. 4, pp. 622–632.

Decision on Petition by United States Patent and Trademark Office, Sep. 26, 1990, (Ser. No. 06/887,466).

*Primary Examiner*—Stephen J. Lechert, Jr.
*Attorney, Agent, or Firm*—Millen, White & Zelano

[57] ABSTRACT

A blasting composition is disclosed having bulk density and hence explosive energy superior to that of conventional ammonium nitrate fuel oil mixtures, e.g. 94% AN, 6% fuel oil mixtures, but of nearly comparable cost. It comprises two major constituents blended together, namely, (1) about 10 to 40% by weight of a water in oil emulsion which includes aqueous solution of a powerful oxidizer salt as the disperse or inner phase and an oil serving to provide oxygen balance as the external or continuous phase, this emulsion being mixed or blended with (2) a mass of essentially solid particulate oxidizer salt in proportions of 60 to 90% of the total. The emulsion, which may be also a slurry, is mixed to partially but not completely fill the pores or interstices in the solid particulate mass, thereby to increase bulk density, part of the spaces being left unfilled to provide aeration and active sites or "hot spots" to facilitate detonation of the composition by standard detonation devices. Ammonium nitrate preferably constitutes most or all the particulate solid salts; the dissolved salts in the emulsion or slurry preferably comprise a mixture of AN with calcium nitrate to enhance solubility. Other salts such as nitrates, chlorates and perchlorates of ammonium, alkali metals and alkaline earth metals may be added or substituted, at least in part.

21 Claims, No Drawings

WATER-IN-OIL BLASTING COMPOSITION

Matter enclosed in heavy brackets [ ] appears in the original patent but forms no part of this reissue specification; matter printed in italics indicates the additions made by reissue.

BACKGROUND AND PRIOR ART

In recent years, conventional compounded explosives used as blasting agents in hard rock mining, excavation, and the like, have been replaced to a considerable extent by less expensive compositions; that is, the high grade and more costly chemical compositions such as TNT, dynamite, nitroglycerine, nitro-starch and the like have been largely supplanted by compositions based to a large extent on cheap ammonium nitrate, particularly fertilizer grade ammonium nitrate (FGAN). Thus, "ANFO", a mixture of ammonium nitrate (AN) and fuel oil (OF) has been widely used under conditions where it is suitable, e.g. where there are no serious problems with water in boreholes and "slurry", which can vary widely in composition, but usually is based on a saturated aqueous solution of AN with thickeners, gelling agents, particulate or liquid fuels, etc., is widely used where ANFO is less suitable.

The principal reasons for shifting to these newer compositions involve considerations of cost. Fertilizer grade ammonium nitrate is widely available and is relatively cheap; fuel oil, even with energy shortages, is much cheaper than most other fuels that could be used for oxygen balance. Water, as a carrier for the oxidizer salt in slurries, is of course very inexpensive, although some of the other ingredients of slurry, such as gel thickeners, particulate high energy metals, such as aluminum granules, particulate magnesium and the like, used as fuels, usually are not cheap.

These newer blasting agents, however, have their deficiencies. ANFO has low bulk density which limits its blasting energy—also, it has poor water resistance and cannot be used in water-containing boreholes unless it is packaged in water-tight containers. Its low bulk density, usually around 0.85 grams per cc., is often a serious disadvantage. Slurry can be made more dense than ANFO but it becomes increasingly difficult to detonate as density is increased. It usually has to be aerated or "gassed" to make it sufficiently sensitive for detonation by conventional primers or boosters. Apparently, tiny air bubbles act as "hot spots" or activation sites to promote detonation. In addition, when it is to be used in relatively deep columns or boreholes, the hydrostatic head imposed on the lower part of the column increases its specific density and it may fail to detonate, leaving unexploded but dangerous charges or partial charges in areas where further mining or excavation operations must be conducted. Many modifications have been proposed, such as proportional gassing to compensate for the compression of normal aeration, cross-linking agents to prevent bubble migration, as well as gelling agents and thickeners, to stabilize the small bubbles of air or gas which provide sensitive "hot spots" to promote the detonation wave, etc. Coalescence of the very small bubbles into larger ones has a marked desensitizing effect. Various fuels have been used and still others proposed to achieve oxygen balance and to give high energy to the explosive, but these are often expensive. Aluminum particles are very effective as fuels but like other ingredients already mentioned, they add substantially to the cost of slurries.

Various suggestions have been made in the prior art for combining slurries and ANFO in attempts to obtain advantages of both. For example, it has been suggested that AN can be made more water resistant if coated with a "grease", and one proposed method is to dust the AN prills with a soap powder which should react with the oil and provide a water resistant coating (Wilson, U.S. Pat. No. 3,287,189). After such treatment, the coated AN is used in a slurry and the deficiencies of slurry, its need for aeration to make it sensitive, etc. still tend to be present. Egly, U.S. Pat. No. 3,161,551, has proposed use of a water-in-oil emulsifier to provide fuel and completely fill the voids in the prilled AN, thereby improving its resistance to moisture, but compositions of this type have been found not to be reliably detonable without being aerated or gassed (See Bluhm U.S. Pat. No. 3,447,978).

Since dense slurries are insensitive and hard or impossible to detonate it has often been proposed to aerate them by heating air into them—see for example, Cattermole, U.S. Pat. No. Re. 28,060. This reference suggests also the use of a water-in-oil emulsion, comprising AN in water, oil and a suitable emulsifier for improving water resistance. To aerate, for sensitivity, the addition of glass bubbles or micro balloons, is suggested. The reference suggests guar gum is to be eliminated, in view of its cost. Wade, U.S. Pat. No. 3,765,964, and Bluhm, U.S. Pat. No. 3,447,978, have somewhat similar suggestions, in part. The latter is of some interest because the water-in-oil emulsion per se there described is rather similar to a composition preferred for the present invention as one of its two major constituents. Bluhm describes the preparation of a water-in-oil emulsion to serve, as such, for the entire explosive composition. It consists of a major proportion of AN, water, a "carbonaceous" fuel which comprises or consists of a special wax, and a water-in-oil emulsifier. He also suggests that the AN may be supplemented by other powerful oxidizers, such as sodium nitrate (SN). His composition must be compounded to include considerable quantities of air, as occluded gas, in volume proportions as high as 37% or more. Small "microspheres", preferably tiny glass bubbles, have been proposed by many as gassing agents. The use of compressible gas-containing explosives in deep boreholes, gives rise to problems already mentioned. The glass bubbles are costly and often not very helpful. However, they are sometimes useful.

Still others in the prior art have suggested various other schemes, procedures and additives to provide the aeration, considered so necessary for density control because sensitivity or detonability is so closely related to density. While such compositions become more sensitive to detonation as their density decreases, other things being equal, they also lose strength in proportion to the reduction in their bulk density in the borehole.

As noted above, many slurries require guar gum or equivalent costly thickener to hold the ingredients together and to impart water resistance. They frequently require also the use of supplemental thickeners or cross-linking agents to hold the gas bubbles in situ or prevent them from coalescing and losing their effectiveness. All these ingredients, even in very small proportions, add substantially to the cost of the finished explosive. In addition, they often cause instability problems. An important object of the present invention is to keep the cost down by avoiding the use of all such costly ingredients, making use of the natural porosity or interstices in particulate salts such as AN. A further object is to simplify the procedures required for making the blasting composition, thereby further reducing costs.

In general terms, the present invention relates to a novel blasting composition which is finally put together from two main and relatively simple constituents, namely, (1) a water-in-oil emulsion and (2) ANFO or AN. Where ANFO is used, not AN, each of these two constituents, i.e., emulsion and ANFO is approximately oxygen-balanced in the preferred procedure, before they are combined, so that the resulting product will necessarily be oxygen balanced, at least approximately. In some cases, however, one constituent may be overbalanced and the other underbalanced, as in the case where the water-in-oil emulsion contains most or all the oil and the other ingredient is primarily the oxidizer salt (AN, or AN plus other salts of generally similar properties), without fuel, or with inadequate fuel for balance.

The two main constituents, i.e., emulsion (or slurry) and essentially solid particles are combined by very simple procedures, preferably just prior to insertion into the blasting site (borehole). Conventional apparatus, such as augur type delivery means may be used to assist in mixing the emulsion into the AN or ANFO. To a large degree, the simplicity and economy of ANFO are retained while a much denser and more efficient but still detonable blasting agent is produced.

Further objects of the present invention, therefore, include the compounding of inexpensive ingredients by simple operations to obtain an improved explosive composition of greater bulk density but adequate sensitivity for good detonation. This avoids the necessity of gassing or aerating and thereby tends to eliminate difficulties which arise in connection with aerated slurries of the prior art. Advantage is taken of the structural properties of AN, or of ANFO, to provide essentially a non-compressible aeration.

SUMMARY OF THE INVENTION

In brief, the novel compositions of the present invention are made up by compounding about 10 to 40% by weight of a water-in-oil emulsion, with no air or gas separately added to it and free of gas generating agents, gelling agents, and the like, with about 90 to 60% by weight of conventional or modified ANFO or equivalent. The compounding is done in such a way that the ANFO or its salt particles structure, solid prills, crystals or flakes, serve to space out or provide air spaces to give the needed miniature gas points which serve as "hot spots" for promoting good detonation. The structure of the ANFO (or of an oil-deficient ANFO or even of particulate AN) as normally used, is such that the emulsion only partly fills voids in its structure. Thereby, the bulk density of the simple two-component mixture is readily controllable. The composition may be made considerably denser than conventional ANFO and may, for convenience, be referred to as a heavy or dense ANFO or "HANFO".

The two major components may be compounded individually in various ways, including methods well known in the art. The slurry or water-in-oil emulsion can be prepared by combining the water, oxidizer (which may be wholly AN, or in some cases mixtures of AN with other strong oxidizers such the alkali and/or alkaline earth metal nitrates, chlorates, perchlorates), part of the oil, or in some cases, all of the oil normally used on conventional ANFO, and the water-in-oil emulsifier. Emulsification may be facilitated by heating the ingredients, separately or together, before or during blending. For combining the emulsion with the comparatively (or completely) dry ANFO (or AN) or partially oiled AN (with or without other oxidizer salts as named above), the liquid emulsion may be fed into a conventional delivery auger of borehole loading equipment by which ANFO is conventionally fed to the blasting sites to be filled. This requires only simple modifications of the conventional ANFO delivery equipment.

The liquid constituent, i.e. the water-in-oil emulsion, per se, preferably has a consistency similar to a paste or a light grease, resembling that of "Vaseline". However, it may be made somewhat thinner or thicker, or more or less viscous. When mixed with ANFO (or with oil deficient AN, etc.), the total composition is a sort of grout-like material, which may be fairly wet or rather dry. It is largely solid and particulate but preferably it has some of the flow properties of a liquid or plastic mass and can be fed readily and satisfactorily into boreholes in conventional ways and with conventional delivery equipment.

The emulsion or liquid-like constituent itself may consist of a simple concentrated, preferably saturated aqueous solution of AN, etc., to which is added part or all of the normal oil content of ANFO, plus the emulsifying agent. Typically, ANFO is made up of about 94 parts by weight of AN and 6 parts of a fuel oil. These proportions may be varied. Fuel oil or diesel oil is commonly used, but other oils, of mineral or other origin, may be used to combine with the fuel oil. These latter ingredients and their relative proportions may vary, of course. In the present system, part of the oil is needed to make up the emulsion; all of it may be combined in the emulsion and none used in the solid component if desired. The balance, if any, is combined with the prilled AN (or with crystalline or flaked AN and/or other ingredients as is known in the art). Fertilizer grade AN, in prill form is the most widely used salt for ANFO. The emulsifier or surface active agent itself may be any one or more of many that are available. Many of these are esters or other derivatives of monohydric or polyhydric alcohols, combined with long chain components or other lyophilic materials. Preferably, the emulsifier is blended into the oil, in which it is readily soluble, before the aqueous component is added but this is not always necessary. Typical surface active emulsifiers which are quite suitable are sorbitan monooleate, sorbitan monostearate, sorbitan monopalmitate, or analogous derivatives of other long chain acids; esters of lanolin fatty acids, such as the isopropyl ester, may be used. Various ethers are also useful, as long as they have a hydrophilic component and an oil soluble chain or branch, as is known in the art. Still others may be mentioned hereinafter.

When ready for blending into the ANFO or into an oil deficient AN, etc., the emulsion preferably resembles soft grease or is a near liquid in consistency. In some cases, the emulsions may be considerably stiffer or more viscous, resembling axle grease in consistency.

As suggested above, the oxidizer salt which is in aqueous solution in the emulsion (the aqueous component being the dispersed phase) may be ammonium nitrate but it preferably includes other powerful oxidizers. In many cases, a blend of AN with calcium nitrate, with or without sodium nitrate (SN), etc., or various other mixtures of the nitrates, chlorates and perchlorates of the alkali and alkaline earth metals, as well as the ammonium salts may be used, especially when they have greater solubility in water than AN or other single salts. Such highly soluble or "eutectic" combinations of salts may be advantageous in making the emulsion more liquid and easier to blend into the dry materials. In some parts of the world, sodium nitrate has economic advantages. A commercial calcium nitrate, which may contain minor proportions of other ingredients, has been found to be a desirable component and examples of compositions containing such materials are given herein below. Within solubility limits, many different salts and combination of salts may be used in the aqueous component, as will be obvious to those skilled in the art.

Among the salts which are suitable for use in the emulsion constituent, there may be mentioned AN, ammonium or sodium perchlorate, sodium nitrate, potassium nitrate, potassium perchlorate, magnesium nitrate, calcium nitrate, and magnesium perchlorate. AN is usually a major ingredient because of its favorable solubility in water, but the addition of certain selected salts may increase this solubility, especially where they may make a sort of "eutectic" mixture.

The total amount of water used may vary; it is desirable to keep water to a minimum, consistent with fluidity requirements in the emulsion. Proportions of as little as 5%, or even as low as 3%, based on the emulsion composition only, to as much as 15%, are preferred. Usually, total water content will be kept well below 15% by weight of the finished compounded mixture and preferably not over 10 to 12%. By contrast, some of the prior art water-in-oil emulsions are described as containing as much as 35% or more of water. This higher water content is very undesirable in the present composition; it detracts very considerably from the energy in a given mass of explosive.

Suitable emulsifiers have been mentioned above. They may also comprise or include certain salts or metals, such as oleates, amine derivatives, such as triethanolamine oleate. Lauryl amine acetate, or related amides of fatty materials such as tall oil, may be used, e.g.; a commercial "EZ-Mul" as named by the manufacturer, Baroid division of National Lead Co., which is understood to be the tall oil amide of tetraethylene pentaamide is suitable. Many other examples may be cited. Numerous effective water-in-oil emulsifiers are known and available. They are to be used in sufficient proportions to obtain a stable and fluid emulsion, or one as non-viscous and as readily miscible with the dry AN or ANFO as is readily available, as will be obvious. Proportions of the emulsifier per se may vary somewhat, preferable limits are from about 0.1 to 1.5%, based on the total composition, or three to four times this amount, based on the emulsion per se. In general, the emulsifier will comprise 1 to 8% of the emulsion, by weight.

Supplementary fuels may be added to the emulsion, as is conventional with slurries and emulsions of the prior art. These may be liquid fuels, preferably polar liquids, such as formamide, some of the amines, ketones, aldehydes, alcohols, etc., or may comprise solid particulate materials, such as metallic aluminum particles or other metals having high fuel value and oxygen balance potential, such as magnesium, silicon, etc. Self explosive particles, such as TNT, smokeless powder, etc., may be included. In many cases, these will add to the cost of the composition and they may preferably be omitted when economy is of high importance. Other and cheaper fuels, such as coal, gilsonite, etc., may be used, as well as some normally solid materials which are highly soluble in the emulsion, or in its aqueous phase, such as sugar and other carbohydrates. Sulfur, ground nutshells, and various carbonaceous solids may be used, as is also known in the prior art. A number of working examples will be given under the description of preferred embodiment of the invention.

DESCRIPTION OF PREFERRED EMBODIMENT

As a first example, a composition was made up, starting with the following emulsion constituent:

28 parts by weight of ammonium nitrate; prilled fertilizer grade, were combined with 48 parts of Norsk Hydro calcium nitrate, known herein as "NHCN", which has a composition per se of about 80% (by weight) of calcium nitrate, 5% ammonium nitrate, and 15% water of crystallization, plus 5% by weight of sodium nitrate. This combination of oxidizer salts was dissolved in 10 parts by weight of water. This aqueous mixture, per se, had a "fudge point" of about 16° C., that is, the salt began to crystallize out at this temperature.

A similar solution was made, using only 5 parts of water. This had a higher fudge point, 68° C., but was still workable and incorporable into a water-in-oil emulsion of relatively soft greasy texture, analogous in workability to "Vaseline". The 10% aqueous solution, consisting of 91 parts by weight, was stirred into a prestirred mixture of 7 parts of fuel oil and 2 parts of a water-in-oil emulsifier. The resulting emulsion, with oil in the exterior or continuous phase, was pourable, of about the consistency of soft grease or Vaseline.

The above emulsion, amounting to 30 parts of the final composition, was blended into 70 parts by weight of ANFO (ammonium nitrate, 94% by weight, fuel oil 6%). The resulting "HANFO" had a density of 1.15 grams per cc.; it was not detonable at room temperature in a 4-inch diameter column, by a conventional blasting cap, thereby qualifying as a safe blasting agent. It was detonated completely with a 150 gram Pentolite booster.

Further examples, following the same procedure as just described, but varying the components, are given in the following table. Silicon metal particles and coal were added as fuel in two cases:

TABLE 1

| Examples: | 1 (70/30) | 2 (65/35) | 3 (60/40) | 4 (with Si.) | 5 (with coal) |
|---|---|---|---|---|---|
| Emulsion Slurry ingredients as % of total comp. | | | | | |
| NHCN | 14.4 | 16.8 | 19.1 | 12.0 | 14.4 |
| AN | 8.4 | 9.8 | 11.2 | 7.0 | 8.4 |
| SN | 1.5 | 1.8 | 2.0 | 1.3 | 1.5 |
| $H_2O$ | 3.0 | 3.5 | 4.0 | 2.5 | 3.0 |
| Fuel Oil | 2.1 | 2.5 | 2.8 | 1.8 | 2.1 |
| Emulsifier | 0.6 | 0.7 | 0.8 | 0.5 | 0.6 |
| Dry or near Dry ANPO comp. | | | | | |
| Dry AN | 65.8 | 61.0 | 56.5 | 58.0 | 64.0 |
| Fuel Oil | 4.3 | 3.9 | 3.6 | 3.7 | — |
| Coal | — | — | — | — | 6.0 |
| Silicon | — | — | — | 13.0 | — |
| Density (g/cc) | 1.15 | 1.25 | 1.35 | 1.20 | 1.15 |
| 4" diam. (Vel., M/sec) | 2500 | — | — | 2500 | Failed |
| 5" diam | — | Failed | — | — | 2500 |
| 6" diam | 3000 | 2500 | Failed | — | — |

The above compositions were not tested for detonation in all diameters and some of them failed to detonate in the column diameters indicated. However, those which were detonated had suitable detonation velocities for use where a heaving rather than a shattering action is desired, as in coal mining and the like. In all cases, it will be necessary to use boosters to assure complete detonation, as will be well understood by those skilled in the art.

Two additional examples are given below. In both of these, all the oil was incorporated in the emulsion, the dry or solid phase being free of oil and consisting in one case of fertilizer grade ammonium nitrate prills and in the other of crystalline AN.

| Example No. | 6 | 7 |
|---|---|---|
| Ingredients of Emulsion Slurry, % by weight based on total composition: | | |
| NCHN | 14.4 | 12.0 |
| AN | 8.4 | 7.0 |
| SN | 1.5 | 1.3 |
| Water | 3.0 | 2.5 |
| Fuel Oil | 6.3 | 1.8 |
| Emulsifier | 1.1 | 1.1 |
| Styrene (liquid) as fuel | — | 4.5 |
| Dry Constituents: | | |
| AN | 65.3 (Prills) | 70.5 (crystalline) |
| Density, g/cc | 1.15 | 1.20 |
| 6" charge diam. (Vel., M/sec) | 2800 | 2500 |

In making up the emulsion, it is preferred to add about 2 parts by weight of emulsifier to 6 or 7 parts of oil, before adding the aqueous solution of oxidizer. In the above examples 6 and 7, the emulsifier used was one designated "T-Chem Emulsifier No. 5", obtained from Thatcher Chemicals Co. in Salt Lake City, Utah. Its exact composition is not known to the present invention, but it appeared to have the characteristics set forth above herein. In any case, a smooth greasy appearing emulsion was obtained, oil being in the external or continuous phase.

Excessive water tends to reduce efficiency of the explosive. Preferably it should not make up more than about 15% by weight of the emulsion and proportions as low as 5% or even 3% can be used. Based on the finished composition, the water content, then, will be only one fourth to about one third of these proportions. Emulsions containing 5% of water instead of 10% were found to be quite comparable in consistency except that at low temperatures, the one with low water content was considerably stiffer. They were cycled between −16° C. and +40° C. with no breakdown of the emulsion. Both were quite stirrable at all temperatures.

In general terms, the compositions of the present invention consist of those having about 60 to 90% by weight of essentially solid ingredients, into which is blended 10 to 40% of the emulsion. The quantity of emulsion is sufficient to fill some but not all of the pores or interstices between the solids. By "solids", it is intended to cover oil-treated particles of salt (usually AN, sprayed with fuel oil but unoiled AN can be used). In some cases, as noted above, the AN prills, crystals, or other salts making up the bulk of the solids will be completely dry, as when all the oil is added to the emulsion. These solids ordinarily will consist of AN, primarily, because fertilizer grade prills are usually the most economical form of oxidizer salt. In some situations, however, the AN may be of crystalline form, or flaked. In others, sodium nitrate (SN) may be less costly and can be substituted, at least in part, for AN. The solids, aside from their oil content in the case of ANFO, preferably comprise 30 to 90% by weight of AN, 0 to 30% of SN, 0 to 30% of potassium nitrate (KN), and 0 to 40% of calcium nitrate (CN). Hollow glass beads or microspheres may be added to provide additional levity or active sites, "hot spots" to promote detonation.

At least part of the oil in the total composition must be included in the emulsion, obviously, and may comprise one or more of the following: Fuel oil, kerosene, diesel oil (often indistinguishable from fuel oil), naphtha, and other mineral or hydrocarbon oils, as well as waxes, paraffins, and asphaltic materials which can be liquefied at reasonable temperatures for incorporation into the emulsion. Other oils such as fish oil, vegetable oils, etc., may be used, as well as reclaimed motor lubricating oils. Readily fusible polymeric oils, e.g. of styrene and other olefins, as well as benzene, toluene, and other non-polar oils may be used. Where these are solid, they must be melted in making up the water-in-oil emulsion.

Emulsifiers, as named above, and including sorbitan monooleate, sorbitan monostearate, -monolaurate, -monopalmitate, and the like, as well as those mentioned above and/or in the references cited above, may be used to form the proper water-in-oil emulsions between the aqueous solution of oxidizer salt and the oily ingredient. Fuels added to the emulsion may include such liquids as ethylene glycol, propylene glycol, formamide, and its analogues, methyl or ethyl alcohol, etc., as will be obvious. Solid fuels may be added, in proportions up to 10 or even 20%.

The emulsion per se, which consists of about 10 to 40%, preferably 20 to 35% of the total composition, should comprise about 3 to 15% by weight of water, preferably 5 to 10%, about 2 to 15% of oil, preferably 5 to 10%, along with 70 to 90% by weight of the salt dissolved in the aqueous phase. The salt will be selected from the solubles nitrates, chlorates and perchlorates of ammonium, alkali metal and alkalines earth metals, those specifically mentioned above being preferred, particularly those which form highly soluble combinations of salts. Usually a substantial proportion of AN will be present in the emulsion as well as in the "dry" or ANFO component. Proportions of emulsifier should be adequate to obtain a good stable emulsion of water-in-oil, but the presence of an excess can be tolerated, as these emulsifiers usually contribute fuel value to the composition. Overall proportions of emulsifier in the total composition may range from as little as 0.1% to as much as 5%, usually between 0.2 and 2% of the total.

It will be obvious to those skilled in the art that many other modifications, substitutions, combinations and sub-combinations or ingredients, and procedures may be used within the scope and spirit of the invention, in addition to those specifically recited above. It is intended by the claims which follow to cover these and all other obvious alternatives and variations as broadly as the state of the art properly permits.

What is claimed is:

1. A blasting composition consisting essentially of 10 to 40% by weight of a greasy water-in-oil emulsion and 60 to 90% of a substantially undissolved particulate solid oxidizer salt constituent, wherein the emulsion comprises about 3 to 15% by weight of water, *about 2 to 15% of oil,* 70 to 90% of powerful oxidizer salt comprising ammonium nitrate which may include other powerful oxidizer salts, wherein the solid constituent comprises ammonium nitrate and in which sufficient aeration is entrapped to enhance sensitivity to a substantial degree, and wherein the emulsion component is emulsified by inclusion of 0.1 to 5% by weight, based on the total composition, of [an oil-in-water] *a water-in-oil* emulsifier to hold the aqueous content in the disperse or internal phase.

2. An explosive composition according to claim 1 wherein the solid constituent consists essentially of ammonium nitrate in particulate form and a small amount of fuel to provide some oxygen balance for said nitrate.

3. An explosive composition according to claim 1 in which the substantially solid constituent consists primarily of ammonium nitrate.

4. A composition according to claim 1 in which the oil of the water-in-oil emulsion is essentially a fuel oil and the solid constituent comprises at least a major proportion of ammonium nitrate.

5. A composition according to claim 1 in which the water-in-oil emulsion includes calcium nitrate and ammonium nitrate dissolved in aqueous media as the disperse phase of said emulsion.

6. A composition according to claim 5 which also contains sodium nitrate.

7. An explosive composition according to claim 1 wherein the emulsion includes an aqueous solution of ammonium nitrate, calcium nitrate, and sodium nitrate and additionally contains a water soluble fuel selected from the group which includes ethylene glycol, propylene glycol, alcohol, and formamide.

8. A composition according to claim 1 wherein the emulsion includes a molten normally solid hydrocarbon.

9. An explosive composition according to claim 1 wherein the emulsion includes in its continuous phase a fuel selected from liquid and normally solid hydrocarbons, emulsified with an aqueous solution in disperse phase of powerful oxidizer salts selected from the group which consists of the nitrate, chlorates and perchlorates of ammonium, alkali metal and alkaline earth metals.

10. An explosive composition according to claim 1 wherein the emulsion includes a fuel selected from the group which consists of fuel oil, kerosene, naphtha, paraffin, wax, vegetable oil, fish oil, reclaimed motor oil, and derivatives of olefins which can be melted to liquid form in preparing the emulsion.

11. An explosive composition according to claim 10 in which a liquid oil is included both in the emulsion and in the solids into which the emulsion is blended.

12. An explosive composition according to claim 1 in which the solid particulate constituent comprises a mixture of a major part of ammonium nitrate with a minor proportion of a fuel oil to provide oxygen balance for said ammonium nitrate.

13. A composition according to claim 1 in which the substantially solid constituent includes 0 to 10% of liquid hydrocarbon fuel, and wherein the remainder of the solid constituent comprises 50 to 100% of ammonium nitrate, 0 to 50% of sodium nitrate, 0 to 50% of calcium nitrate, and 0 to 50% of potassium nitrate.

14. A composition according to claim 1 in which the water-in-oil emulsion contains about 0.1 to 2%, based on weight of the total composition, of an emulsifier selected from the group which consists of sorbitan monooleate, sorbitan monostearate, sorbitan monopalmitate, sorbitan monolaurate, stearic acid, and long chain fatty acid derivatives of metals which have solubility in water.

15. A composition as in claim 1 which has an overall oxygen balance between −12 and +4%.

16. An explosive composition which comprises, in combination, (1) a solid particulate and undissolved nitrate oxidizer in proportions of at least 50% by weight of the total, (2) 0 to 10% of hydrocarbon mixed with the particulate nitrate oxidizer, (3) a solid particulate fuel, and (4) 10 to 40% by weight of a dense water-in-oil phase emulsion, said emulsion containing an oil as its continuous phase and as disperse phase an aqueous solution of a powerful oxidizer salt selected from the group which consists of the nitrates, chlorates, and perchlorates of ammonium, alkali metal and alkaline earth metal as the discontinuous phase, said emulsion being stabilized by a water-in-oil emulsifier.

17. A composition according to claim 16 in which the particulate oxidizer consists of ammonium nitrate combined with at least one other nitrate.

18. Composition according to claim 16 in which the particulate oxidizer consists essentially of ammonium nitrate.

19. Composition according to claim 16 which includes gas filled particles to impart aeration and hence detonation sensitivity to the composition.

20. An explosive composition according to claim 1 in which the emulsion is a slurry containing particulate fuel as well as an aqueous solution of nitrates of ammonium, calcium and sodium, and in which the substantially solid constituent consists essentially of ammonium nitrate treated with fuel oil to improve oxygen balance.

21. An explosive composition according to claim 16 in which the emulsion contains a water soluble fuel.

* * * * *